United States Patent
Arechiga-Gonzalez et al.

(10) Patent No.: US 11,479,239 B2
(45) Date of Patent: Oct. 25, 2022

(54) PREDICTIVE PARKING DUE TO WEATHER

(71) Applicant: TOYOTA RESEARCH INSTITUTE, INC., Los Altos, CA (US)

(72) Inventors: Nikos Arechiga-Gonzalez, San Mateo, CA (US); Soonho Kong, Arlington, MA (US); Jonathan Decastro, Arlington, MA (US); Frank Permenter, Cambridge, MA (US); Dennis Park, Fremont, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 14 days.

(21) Appl. No.: 17/097,727

(22) Filed: Nov. 13, 2020

(65) Prior Publication Data
US 2022/0153258 A1    May 19, 2022

(51) Int. Cl.
*H04N 5/44* (2011.01)
*B60W 30/06* (2006.01)
*B60W 40/02* (2006.01)
*B60W 50/14* (2020.01)
*G08G 1/14* (2006.01)

(52) U.S. Cl.
CPC ............ *B60W 30/06* (2013.01); *B60W 40/02* (2013.01); *B60W 50/14* (2013.01); *G08G 1/145* (2013.01); *B60W 2050/143* (2013.01); *B60W 2555/20* (2020.02); *B60W 2556/50* (2020.02)

(58) Field of Classification Search
CPC ...... B60W 30/06; B60W 40/02; B60W 50/14; B60W 2050/143; B60W 2555/20; B60W 2556/50; G08G 1/145
See application file for complete search history.

(56) References Cited

U.S. PATENT DOCUMENTS

| | | | |
|---|---|---|---|
| 8,884,784 B2 | 11/2014 | Kirsch | |
| 9,248,823 B2 | 2/2016 | MacNeille et al. | |
| 9,666,074 B2 | 5/2017 | Nicoll et al. | |
| 9,911,331 B2* | 3/2018 | Jördens | H04Q 9/00 |
| 10,214,240 B2 | 2/2019 | Ghose et al. | |
| 10,755,357 B1* | 8/2020 | Davis | G06V 20/176 |
| 10,807,591 B1* | 10/2020 | Kentley-Klay | G08B 21/10 |
| 10,997,664 B1* | 5/2021 | McAlister | G08G 1/096775 |

(Continued)

FOREIGN PATENT DOCUMENTS

JP    2019-215646 A    12/2019

*Primary Examiner* — Munear T Akki
(74) *Attorney, Agent, or Firm* — Oblon, McClelland, Maier & Neustadt, L.L.P.

(57) ABSTRACT

Aspects of the disclosure provide a parking method and system for a vehicle. For example, the parking system can include a processor and an output circuit. As another example, the parking system can include the processor and a compelling unit. The processor can be configured to determine whether a first weather condition, such as snowing, raining, icing and hailing, at a first parking location meets a first criterion, and identify, when the first weather condition meets the first criterion, a second parking location at which a second weather condition meets a second criterion different from the first criterion. The output unit can be configured to output an alert to the vehicle parked at the first parking location indicating that the vehicle is to be moved to the second parking location. The compelling unit can be configured to compel the vehicle to move to the second parking location.

19 Claims, 7 Drawing Sheets

(56) References Cited

U.S. PATENT DOCUMENTS

| | | | | |
|---|---|---|---|---|
| 11,001,231 | B1* | 5/2021 | Hedman | B60R 16/0237 |
| 2002/0116080 | A1* | 8/2002 | Bimbach | G01P 15/18 |
| | | | | 700/66 |
| 2009/0171170 | A1* | 7/2009 | Li | A61B 5/00 |
| | | | | 600/301 |
| 2010/0231379 | A1* | 9/2010 | Hutzler | G08B 21/0453 |
| | | | | 340/539.12 |
| 2011/0118897 | A1* | 5/2011 | Menard | B60J 7/0573 |
| | | | | 701/1 |
| 2014/0276238 | A1* | 9/2014 | Osorio | G08B 21/0446 |
| | | | | 600/595 |
| 2015/0094544 | A1* | 4/2015 | Spolin | A61B 5/0008 |
| | | | | 600/300 |
| 2015/0332581 | A1* | 11/2015 | Gaurav | G08B 25/005 |
| | | | | 340/539.13 |
| 2016/0038055 | A1* | 2/2016 | Wheeler | A61B 5/7225 |
| | | | | 600/301 |
| 2018/0194343 | A1* | 7/2018 | Lorenz | G08G 1/168 |
| 2018/0215374 | A1* | 8/2018 | Lee | G08G 1/147 |
| 2019/0369623 | A1* | 12/2019 | Sadakiyo | G05D 1/0214 |
| 2021/0107518 | A1* | 4/2021 | Geissler | G06Q 10/06311 |
| 2021/0125477 | A1* | 4/2021 | Kelly | G08B 19/00 |
| 2021/0216928 | A1* | 7/2021 | O'Toole | G06F 16/287 |
| 2021/0370948 | A1* | 12/2021 | Yamaguchi | B60W 10/18 |

* cited by examiner

PREDICTIVE PARKING DUE TO WEATHER

TECHNICAL FIELD

The present disclosure relates in general to a field of a parking service, and, more particularly, to a parking method and system for a vehicle that minimize the risk of parking the vehicle in an area that will be adversely impacted by weather.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

It can be difficult to find parking spots in some areas. Some patents and publications have described finding parking spots taking weather into consideration for various reasons.

For example, U.S. Pat. No. 9,248,823 is directed to a method and apparatus for providing parking instructions to reduce environmental vehicle effects. The disclosed apparatus identifies parking spots in the context of battery performance and maintenance using weather data for the areas in which the identified parking spots reside. See FIGS. 3 and 6, and col. 7, ll. 8-20 and col. 8, ll 5-18.

Additionally, U.S. Pat. No. 10,214,240 discloses parking scoring for autonomous vehicles. The disclosed system comprises vehicles that can be summoned by user devices for "rides." Each ride terminates at a destination about which a parking location is sought. Candidate parking locations are scored based on various parameters, which include weather. See FIG. 6, and col. 13, line 62 to col. 14, line 17.

U.S. Pat. No. 9,666,074 discloses a method and system for vehicle parking. The disclosed system collects data, which is used to learn a parking behavior for a given user as a function of a vehicle being driven (e.g., the size and type of the vehicle, as well as which park assist features were available on the vehicle), as well as weather conditions, traffic conditions, location, route, etc. See col. 3, line 50 to col. 4, line 8.

U.S. Pat. No. 8,884,784 discloses a solar charged automotive vehicle having means to determine a parking location. The disclosed system seeks parking locations having sufficient solar exposure for charging an electric or hybrid vehicle by way of solar panels, such as an area that is experiencing and expected to experience a clear weather. To that end, weather information may be used to identify overcast situations. See FIG. 4, and col. 4, ll 13-24.

JP 2019-215646 is directed to a parking position guidance system and parking position guidance program. In the disclosed apparatus, parking position guidance is based on changes in weather.

The above-mentioned patents and publications are incorporated herein by reference in their entirety, except for any definitions, disclaimers, disavowals, and inconsistencies.

However, none of the above patents and publications has taken into consideration whether the weather will adversely impact a vehicle when finding parking spots.

SUMMARY

Aspects of the disclosure provide a parking method for a vehicle. In an embodiment, the parking method can include determining whether a first weather condition at a first parking location meets a first criterion, identifying, when the first weather condition meets the first criterion, a second parking location at which a second weather condition meets a second criterion different from the first criterion, and outputting with an output unit an alert to the vehicle parked at the first parking location indicating that the vehicle is to be moved to the second parking location, or compelling the vehicle to move to the second parking location. In another embodiment, the parking method can further include determining navigation information from the first parking location to the second parking location, and moving the vehicle based on the navigation information.

In an embodiment, the first weather condition can include snowing, and the first criterion can include at least one of a snowfall amount of the snowing exceeding a snowfall amount threshold and a snowing duration of the snowing being less than a snowing duration threshold.

In an embodiment, the first weather condition can include raining, and the first criterion can include at least one of a rainfall amount of the raining exceeding a rainfall amount threshold and a raining duration being less than a raining duration threshold. In another embodiment, the first criterion can further include the first parking location being located in a flood zone.

In an embodiment, the first weather condition can include hailing, and the first criterion can include at least one of a hailstone size of the hailing exceeding a hailstone size threshold, a hail thickness of the hailing exceeding a hail thickness threshold and a hailing duration of the hailing exceeding a hailing duration threshold. In another embodiment, the first criterion can further include the first parking location being uncovered.

In an embodiment, the first weather condition can include icing, and the first criterion can include at least one of an ice amount of the icing exceeding an ice amount threshold and an icy road duration of the icing exceeding an icy road duration threshold.

Aspects of the disclosure further provide a parking system for a vehicle. In an embodiment, the parking system can include a memory, a processor and an output unit. In another embodiment, the parking system can include the memory, the processor and a compelling unit. The memory can be configured to store a first criterion and a second criterion different from the first criterion. The processor can be coupled to the memory and configured to determine whether a first weather condition at a first parking location meets the first criterion, and identify, when the first weather condition meets the first criterion, a second parking location at which a second weather condition meets the second criterion. The output unit can be coupled to the processor and configured to output an alert to the vehicle parked at the first parking location indicating that the vehicle is to be moved to the second parking location. The compelling unit can be coupled to the processor and configured to compel the vehicle to move to the second parking location. In another embodiment, the processor can be further configured to determine navigation information from the first parking location to the second parking location, and move the vehicle based on the navigation information.

The foregoing general description of the illustrative embodiments and the following detailed description thereof are merely exemplary aspects of the teachings of this disclosure, and are not restrictive.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

A parking system and a parking method are provided according to some embodiments of the disclosure to minimize the risk of parking a vehicle in an area that will be adversely impacted by weather. For example, the parking system can be able to consider adverse weather, such as snow, ice, hail, torrential rain, etc., and determine if the adverse weather may adversely affect the vehicle at its current location. As another example, the parking system can determine the location of a vehicle and current and future weather patterns that may affect the location where the vehicle is located. As such, inputs for the system can include weather forecasts, navigation information, availability of parking spots/congestion, vehicle sensor data, topology information etc. The exemplary parking system can also inform the operator of the vehicle or instruct an autonomous vehicle control system of the vehicle to move the vehicle to a different location to avoid any damage to the vehicle from the adverse weather. The parking system and method according to some embodiments of the disclosure can automatically determine if the vehicle is potentially going to be parked in an area that will be impacted by weather. With the parking system and method, the operator of the vehicle can be aware of any adverse weather and then not to park the vehicle in an area that would possibly be impacted by the adverse weather.

Figure 1:
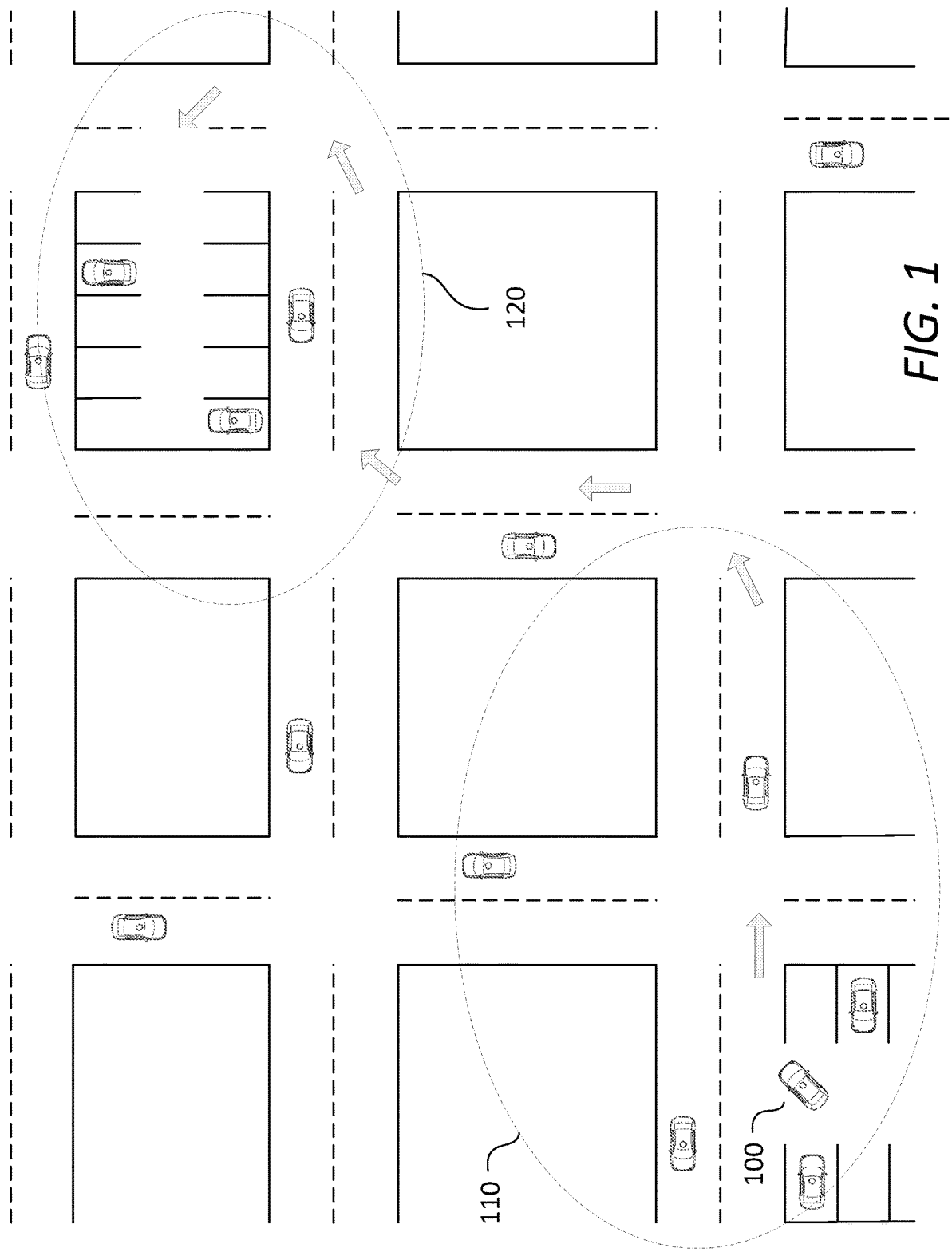
FIG. 1 is a schematic diagram illustrating a vehicle moving from a first parking location to a second parking location according to some embodiments of the disclosure.
Figure 2:
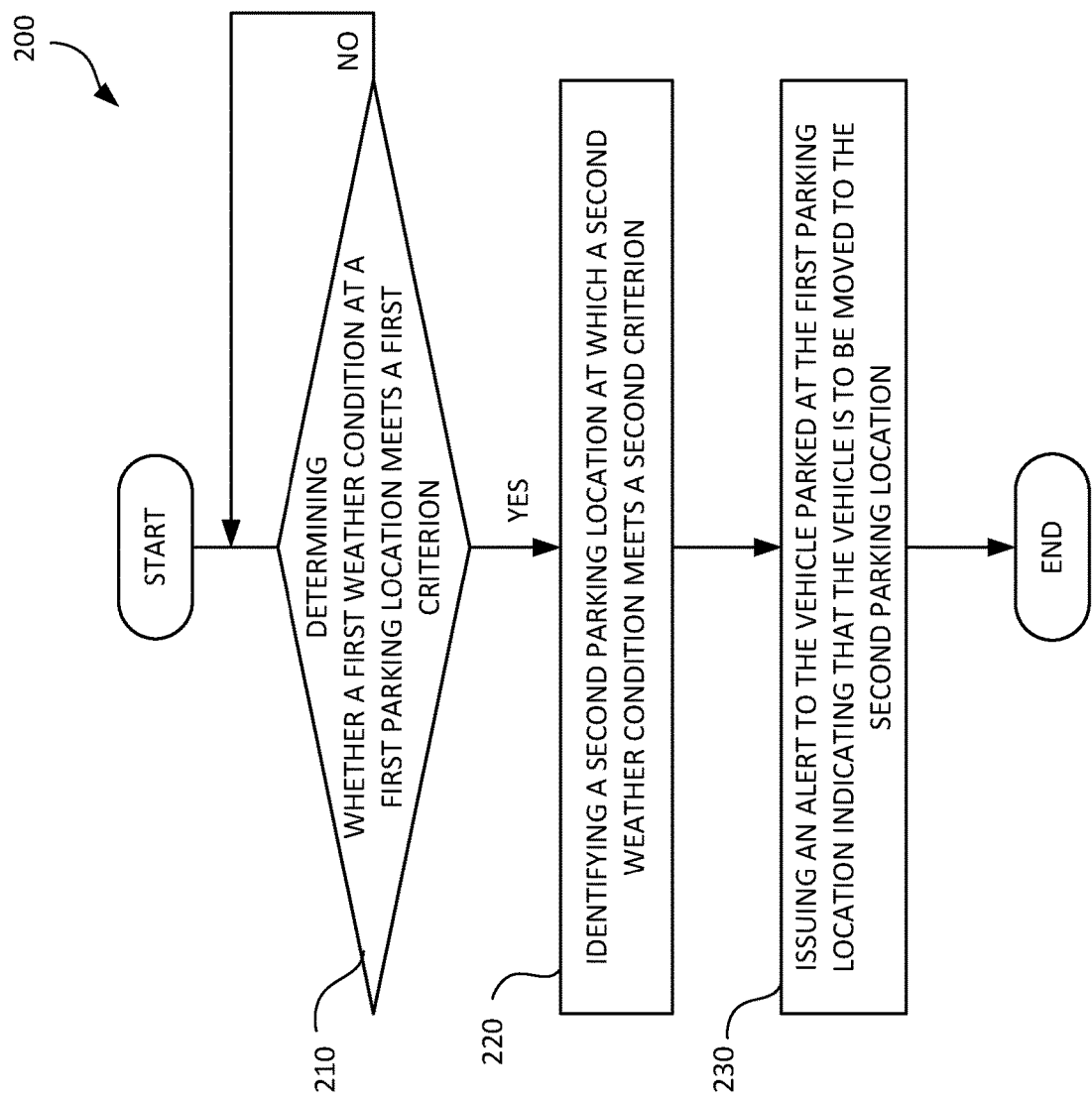
FIG. 2 shows a flow chart of an exemplary parking method for a vehicle according to some embodiments of the disclosure.

FIG. 1 is a schematic diagram illustrating a vehicle 100 moving from a first parking location 110 to a second parking location 120 according to some embodiments of the disclosure. FIG. 2 shows a flow chart of an exemplary parking method 200 for the vehicle 100 according to some embodiments of the disclosure. The parking method 200 can predictively move the vehicle 100 from the first parking location 110 at which the weather condition may adversely impact the vehicle 100 to the second parking location 120 at which the weather condition will not adversely impact the vehicle 100. The parking method 200 can include steps 210, 220 and 230. In an embodiment, some of the steps of the parking method 200 shown can be performed concurrently or in a different order than shown, can be substituted by other method steps, or can be omitted. Additional method steps can also be performed as desired. Aspects of the parking method 200 can be implemented by a wireless device.

At step 210, whether a first weather condition at a first parking location, e.g., the first parking location 110 shown in FIG. 1, meets a first criterion is determined. In an embodiment, if the first weather condition meets the first criterion, the parking method 200 proceeds to step 220; otherwise, the parking method 200 can keep performing step 210, that is, keeping determining whether the first weather condition meets the first criterion. In another embodiment, if the first weather condition at the first parking location 110 does not meet the first criterion, the parking method 200 can end, which means that the first weather condition at the first location 110 does not adversely impact the vehicle 100 and the parking method 200 does not need to identify another parking location at which the weather condition will not adversely impact the vehicle 100.

In an embodiment, the first weather condition can include raining, and the first criterion can include at least one of a rainfall amount of the raining exceeding a rainfall amount threshold and a raining duration being less than a raining duration threshold. For example, if the rainfall amount of the raining exceeds the rainfall amount threshold, the parking method 200 can proceed to step 220, which indicates that the first parking location 110 may be flooded and the vehicle 100 may become a water-logged vehicle. As another example, if the raining duration of the raining exceeds the raining duration threshold, the parking method 200 may keep performing step 210 or end, even if the rainfall amount exceeds the rainfall amount threshold, as the raining may have a light or moderate rainfall rate, e.g., less than 0.10 or 0.10 to 0.30 inches of rain per hour, water accumulated at the first parking location 110 due to the raining will flow away in time, and no flooding at the first parking location 110 will occur. In another embodiment, the topology information of the first parking location 110 can be taken into consideration in the determination of whether the first weather condition at the first parking location 100 meets the first criterion. In yet another embodiment, the first criterion can further include the first parking location 110 being located in a flood zone. For example, if it is determined at step 210 that the first parking location 110 is not located in a flood zone, the parking method 200 can keep performing step 210 or end, even if the rainfall amount of the raining exceeds the rainfall amount threshold and the raining duration is less than the raining duration threshold, as the water accumulated at the first parking location 110 due to the raining may flow away from the first parking location 110 very quickly and will not flood the vehicle 100. Whether the first parking location 110 is located in a flood zone can be known by checking the Federal Emergency Management Agency (FEMA) flood map.

In an embodiment, the first weather condition can include hailing, and the first criterion can include at least one of a hailstone size of the hailing exceeding a hailstone size threshold, a hail thickness of the hailing exceeding a hail thickness threshold, and a hailing duration of the hailing exceeding a hailing duration threshold. For example, if it is determined at step 210 that the hailstone size of the hailing does not exceed the hailstone size threshold, the parking method 200 does not proceed to step 220, that is, without identifying a second parking location for the vehicle 100, as the hailstone size of the hailing is not large enough to adversely impact the vehicle 100 parked at the first parking location 110 at which the hailing occurs. In another embodiment, the first criterion can further include the first parking location 110 being uncovered. For example, if the first weather condition is hailing, the parking method 200 does not need to proceed to step 220, as long as the first parking location 110 is covered, e.g., a garage, even if the hailstone size exceeds the hailstone size threshold, as the vehicle 100 will be protected very well at the covered first parking location 110. Hail falls when the thunderstorm's updraft can no longer support the weight of the ice. The stronger the updraft is, the larger the hailstone can grow. Hailing most occurs in Nebraska, Colorado and Wyoming. Hailstone size may range from ¼ inch diameter ("Pea") to as large as 4½ inches diameter ("Grapefruit"). For small hailstones, having less than 1 inch diameter, the expected falling speed is between 9 and 25 per hour. Grapefruit hail may have expected falling speed as high as 44 to 72 miles per hour. Grapefruit hail is thus very likely to cause damages to the vehicle 100. Machine learning techniques or models are tested for the forecast of large hail events. Some scientists use dual polarized radar to forecast hail and predict the hailstone size.

In an embodiment, the first weather condition can include icing, and the first criterion can include at least one of an ice amount of the icing exceeding an ice amount threshold and an icy road duration of the icing exceeding an icy road duration threshold. For example, if the ice amount of the icing exceeds the ice amount threshold, which indicates that the vehicle 100, if parked or moving at the first parking location 110, may be adversely impacted due to the icing, and the parking method 200 can proceed to step 220, to identify a second parking location at which a second weather condition does not adversely impact the vehicle 100. As another example, if the icing duration exceeds the icing duration threshold, the parking method 200 may keep performing step 210 or end, even if the ice amount of the icing exceeds the ice amount threshold, as the ice may gradually evaporate during the icing duration and the vehicle 100 is not likely to skid and be impacted by the icing. Drivers need reliable forecasts and alerts for icy road conditions, particularly the presence of black ice. An icing event may occur when road surface temperature is below the freezing point of water (i.e., <32° F./0° C.) and precipitation-falling is in progress. Icing event can be predicted based on air temperature, humidity, dew point, pressure wind speed and precipitation type and occurrence. Freezing rain, which may occur when road surface temperature is below 36° F./3° C. and surface relative humidity (RH) is at or near saturation (approaching 100%) may also ice road.

In an embodiment, the first weather condition can include snowing, and the first criterion can include at least one of a snowfall amount of the snowing exceeding a snowfall amount threshold and a snowing duration of the snowing being less than a snowing duration threshold. For example, if the snowfall amount of the snowing exceeds the snowfall amount threshold, which indicates that the vehicle 100 parked at the first parking location 110 may be adversely impacted due to the snowing, the parking method 200 can proceed to step 220, to identify a second parking location at which a second weather condition does not adversely impact the vehicle 100. As another example, if the snowing duration exceeds the snowing duration threshold, the parking method 200 may keep performing step 210 or end, even if the snowfall amount of the snowing exceeds the snowfall amount threshold, as the snow may gradually evaporate during the snowing duration and the vehicle 100 is not likely to be buried and impacted by the snowing.

At step 220, a second parking location, e.g., the second parking location 120 shown in FIG. 1, at which a second weather condition meets a second criterion, is identified, after it is determined at step 210 that the first weather condition at the first parking location 110 meets the first criterion, which indicates that the vehicle 100 parked at the first parking location 110 may be adversely impacted due to weather. For example, the second weather condition can also include snowing, raining, hailing and icing. In an embodiment, the second weather condition can be different from the first criterion. In another embodiment, the second criterion can be opposite to the first criterion. For example, the first criterion can be a rainfall amount of raining exceeding a rainfall amount threshold and the first parking location 110 being located in a flood zone, and the second criterion can be a rainfall amount of raining being less than the rainfall amount threshold or the first parking location 110 being not located in a flood zone. Accordingly, if it is determined at step 210 that the first weather condition is raining, the rainfall amount of the raining exceeds the rainfall amount threshold, and the first parking location 110 is located in a flooding zone, the second parking location 120 can be identified at step 220, as long as the rainfall amount of the raining at the second parking location 120 is less than the rainfall amount threshold, or the second parking location 120 is not located in a flooding zone, though the rainfall amount of the raining at the second parking location 120 may exceed the rainfall amount threshold.

In an embodiment, the second parking location 120 can be identified to be a parking spot that has at least a predetermined number of available parking spaces. As it takes time for the vehicle 100 to move from the first parking location 110 to the second parking location 120, the second parking location 120 thus identified can be a parking spot that has at least a predetermined number of available, to ensure that there is still at least one parking space available for the vehicle 100 when it arrives at the parking spot.

In an embodiment, the parking method 200 can further include receiving the first weather condition and the second weather condition from a weather forecast entity. For example, the weather forecast entity can be weather forecast bureau, which provide coarse weather forecast data, such as synoptic-scale and meso-scale meteorology data (e.g., Meso-β and Meso-γ) which can be valid for ten minutes to two days. As another embodiment, the weather forecast entity can be crowd sources, e.g., crowdsourced apps, which involve a large, relatively open and often evolving group of participants and can provide nearly real time (e.g., every ten minutes) granular weather forecast data, such as micro-scale meteorology data.

In another embodiment, the parking method 200 can further include sensing, with at least one sensor, the first weather condition surrounding the vehicle 100. For example, the parking method 200 can obtain the first weather condition surrounding the vehicle 100 from vehicle sensor data, such as, but not limited to, temperature, humidity, barometric pressure and solar heating. These data can be augmented with data available from back-end weather services to provide meteorological data such as wind speed and direction. In an embodiment, a thermometer used to sense the temperature and a hygrometer used to sense the humidity can be installed on the vehicle 100.

At step 230, an alert can be output with an output unit to the vehicle 100 parked at the first parking location 110 indicating that the vehicle 100 is to be moved to the second parking location 120. In an embodiment, the output unit can be a wireless transmitter that transmits the alert to the vehicle 100 after the first weather condition at the first parking location 110 is determined at step 210 to adversely impact the vehicle 100 and the second parking location 120 at which the second weather condition does not impact the vehicle 100 is identified at step 220. After the vehicle 100 receives the alert, the operator of the vehicle 100 can drive the vehicle 100 to move from first parking location 110 to the second parking location 120.

In an embodiment, the method 200 can further include the steps of determining navigation information from the first parking location 110 to the second parking location 120, and moving the vehicle 100 based on the navigation information. For example, after the vehicle 100 receives the alert, the operator of the vehicle 100 can follow the navigation information, as indicated by the arrows shown in FIG. 1, and drive the vehicle 110 to move from the first parking location 110 to the second parking location 120.

Figure 3:
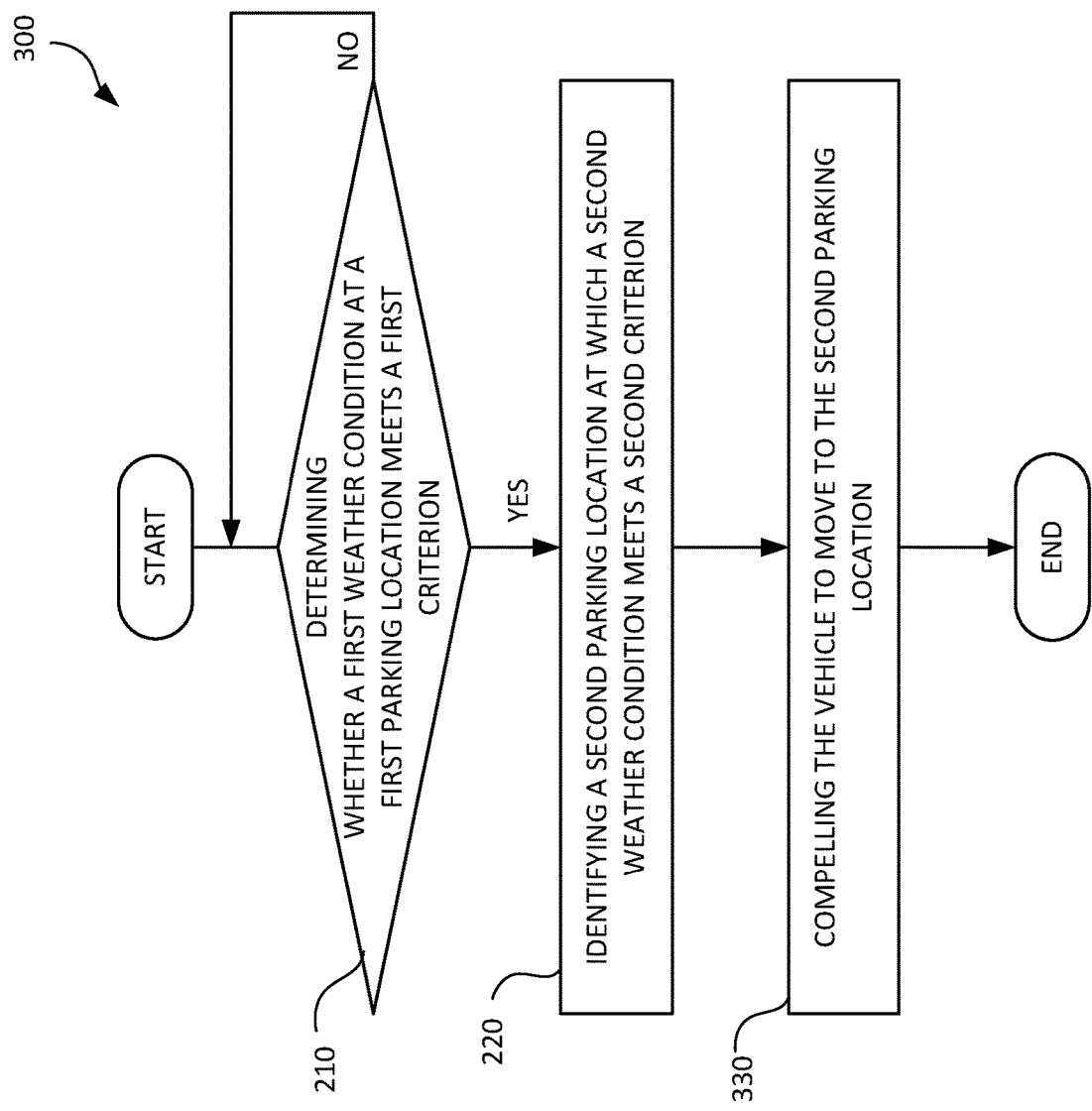
FIG. 3 shows a flow chart of another exemplary parking method for a vehicle according to some embodiments of the disclosure.

FIG. 3 shows a flow chart of an exemplary parking method 300 for the vehicle 100 according to some embodiments of the disclosure. The parking method 300 can also predictively move the vehicle 100 from the first parking location 110 at which the weather condition may adversely impact the vehicle 100 to the second parking location 120 at which the weather condition will not adversely impact the vehicle 100. The parking method 300 can include steps 210 and 220 and step 330. In an embodiment, some of the steps of the parking method 200 shown can be performed concurrently or in a different order than shown, can be substituted by other method steps, or can be omitted. Additional method steps can also be performed as desired. Aspects of the parking method 300 can be implemented by a wireless device.

At step 330, the vehicle 100 can be compelled to move from the first parking location 110 to the second parking location 120, after the first weather condition at the first parking location 110 is determined to meet the first criterion at step 210 and the second parking location 120 at which the second weather condition meets the second criterion is identified at step 220. In an embodiment, the vehicle 100 can be an autonomous or partially self-driving vehicle, and be compelled to move from the first parking location 110 to the second parking location 120 autonomously. For example, the vehicle 100 can sense the environment by using vehicle sensing devices such as radar, LiDAR, image sensors, and the like. As another example, the vehicle 100 can further use information from global positioning systems (GPS) technology, navigation systems, vehicle-to-vehicle (V2V) communication, vehicle-to-infrastructure technology (V2I), infrastructure-to-vehicle (V2I/I2V) communication and/or drive-by-wire systems to know the first parking location 110 and the second parking location 110. For example, the GPS technology can provide data associated with the first parking location 110 and the second parking location 120, and data regarding traffic, road construction, route selection, etc.

In an embodiment, the parking method 300 can also further include receiving the first weather condition and the second weather condition from a weather forecast entity. In another embodiment, the parking method 300 can also further include sensing, with at least one sensor, the first weather condition surrounding the vehicle 100. In yet another embodiment, the method 300 can also further include the steps of determining navigation information from the first parking location 110 to the second parking location 120, and moving the vehicle 100 based on the navigation information.

Figure 4:
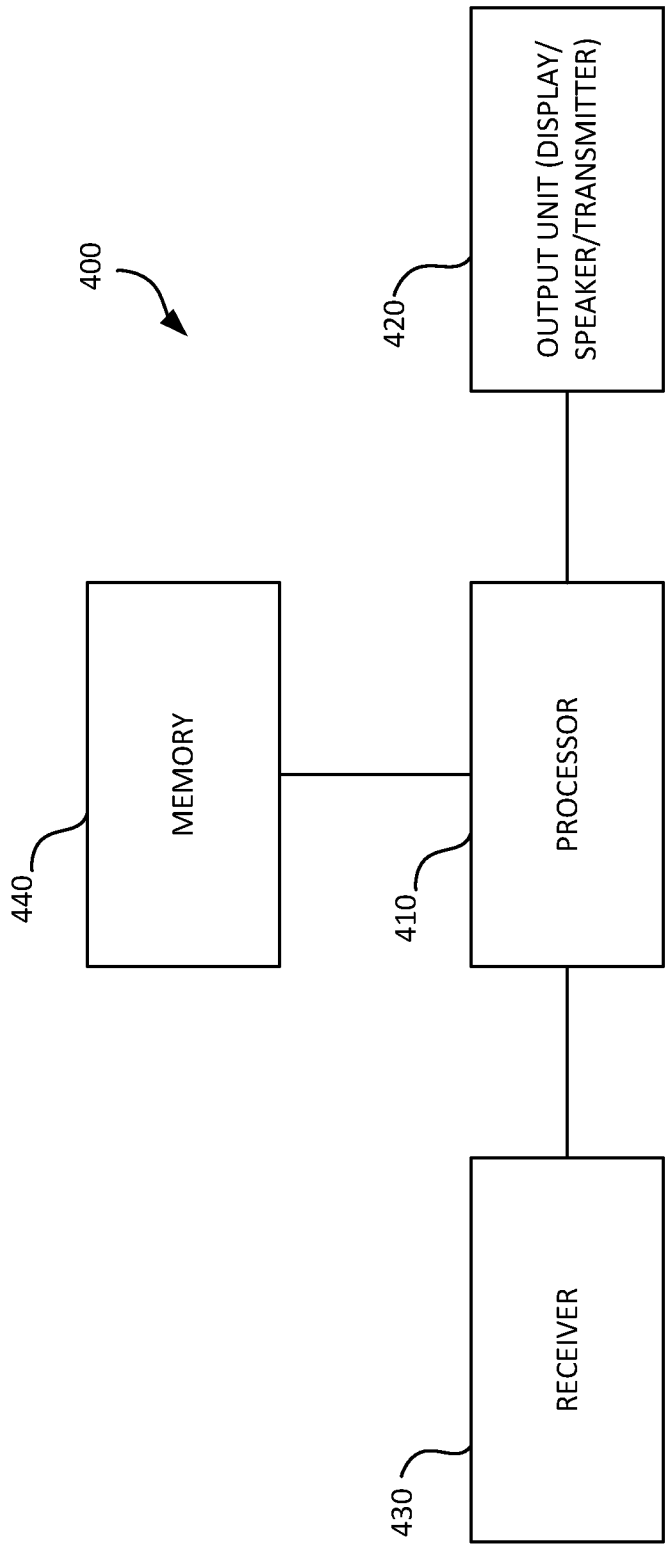
FIG. 4 is a functional block diagram of an exemplary parking system for a vehicle according to some embodiments of the disclosure.

FIG. 4 is a functional block diagram of an exemplary parking system 400 for a vehicle according to some embodiments of the disclosure. The parking system 400 can be configured to perform various functions in accordance with one or more embodiments or examples described herein. Thus, the parking system 400 can provide means for implementation of mechanisms, techniques, processes, functions, components or systems described herein. For example, the parking system 400 can be used to implement the methods in various embodiments and examples described herein. The parking system 400 can include a general purpose processor or specifically designed circuits to implement various functions, components or processes described herein in various embodiments. In an embodiment, the parking system 400 can include a processor 410, a receiver 420, a memory 430, and an output unit 440.

The memory 430 can be configured to store a first criterion and a second criterion different from the first criterion. The processor 410 can be coupled to the memory 430 and configured to determine whether a first weather condition at a first parking location, e.g., the first parking location 110, meets the first criterion, and identify, when the first weather condition meets the first criterion, a second parking location, e.g., the second parking location 120, at which a second weather condition meets the second criterion. In an embodiment, the processor 410 can be further configured to determine navigation information from the first parking location 110 to the second parking location 120, and move the vehicle based on the navigation information. In another embodiment, the processor 410 can be further configured to identify a parking spot at the second parking location 120 that has at least a predetermined number of available parking spaces. The output unit 420 can be configured to output an alert to the vehicle 100 parked at the first parking location 110 indicating that the vehicle 110 is to be moved to the second parking location 120. For example, the output unit 420 can be a display, and the alert can be texts, graphs or video signals displayed on the display. As another example, the output unit 420 can be a speaker, and the alert can be audio signals output from the speaker. As yet another example, the output unit 420 can be a transmitter that transmits the alert to the vehicle. The receiver 430 can be configured to receive the first and second weather conditions from a weather forecast entity. In an embodiment, the receiver 430 and the transmitter 420 can be included in a transceiver.

In an embodiment, the first weather condition can include snowing, and the first criterion can include at least one of a snowfall amount of the snowing exceeding a snowfall amount threshold and a snowing duration of the snowing being less than a snowing duration threshold. In another embodiment, the first weather condition can include raining, and the first criterion can include at least one of a rainfall amount of the raining exceeding a rainfall amount threshold, a raining duration being less than a raining duration threshold, and the first parking location being located in a flooding area. In yet another embodiment, the first weather condition can include hailing, and the first criterion can include at least one of a hailstone size of the hailing exceeding a hailstone size threshold, a hail thickness of the hailing exceeding a hail thickness threshold, a hailing duration of the hailing exceeding a hailing duration threshold, and the first parking location being uncovered. In still another embodiment, the first weather condition can include icing, and the first criterion can include at least one of an ice amount of the icing exceeding an ice amount threshold and an icy road duration of the icing exceeding an icing road duration threshold.

Figure 5:
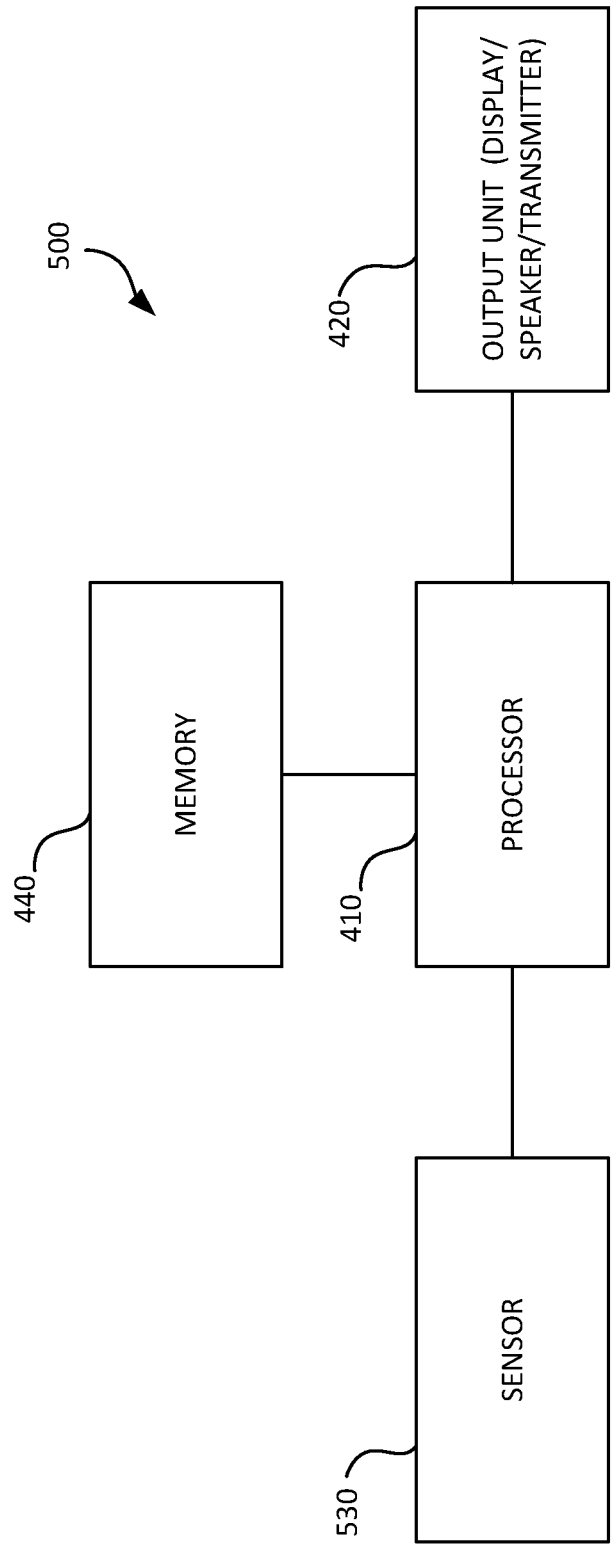
FIG. 5 is a functional block diagram of another exemplary parking system for a vehicle according to some embodiments of the disclosure.

FIG. 5 is a functional block diagram of another exemplary parking system 500 for a vehicle according to some embodiments of the disclosure. In an embodiment, the parking system 500 can include the memory 440, the processor 410, the output unit 420, and a sensor 530. The sensor 530 can be coupled to the processor 410 and configured to sense the first weather condition surrounding the vehicle 100. In an embodiment, the first weather condition can include temperature, humidity, barometric pressure and solar heating. In another embodiment, the sensor 530 can include at least one of a thermometer and a hygrometer.

Figure 6:
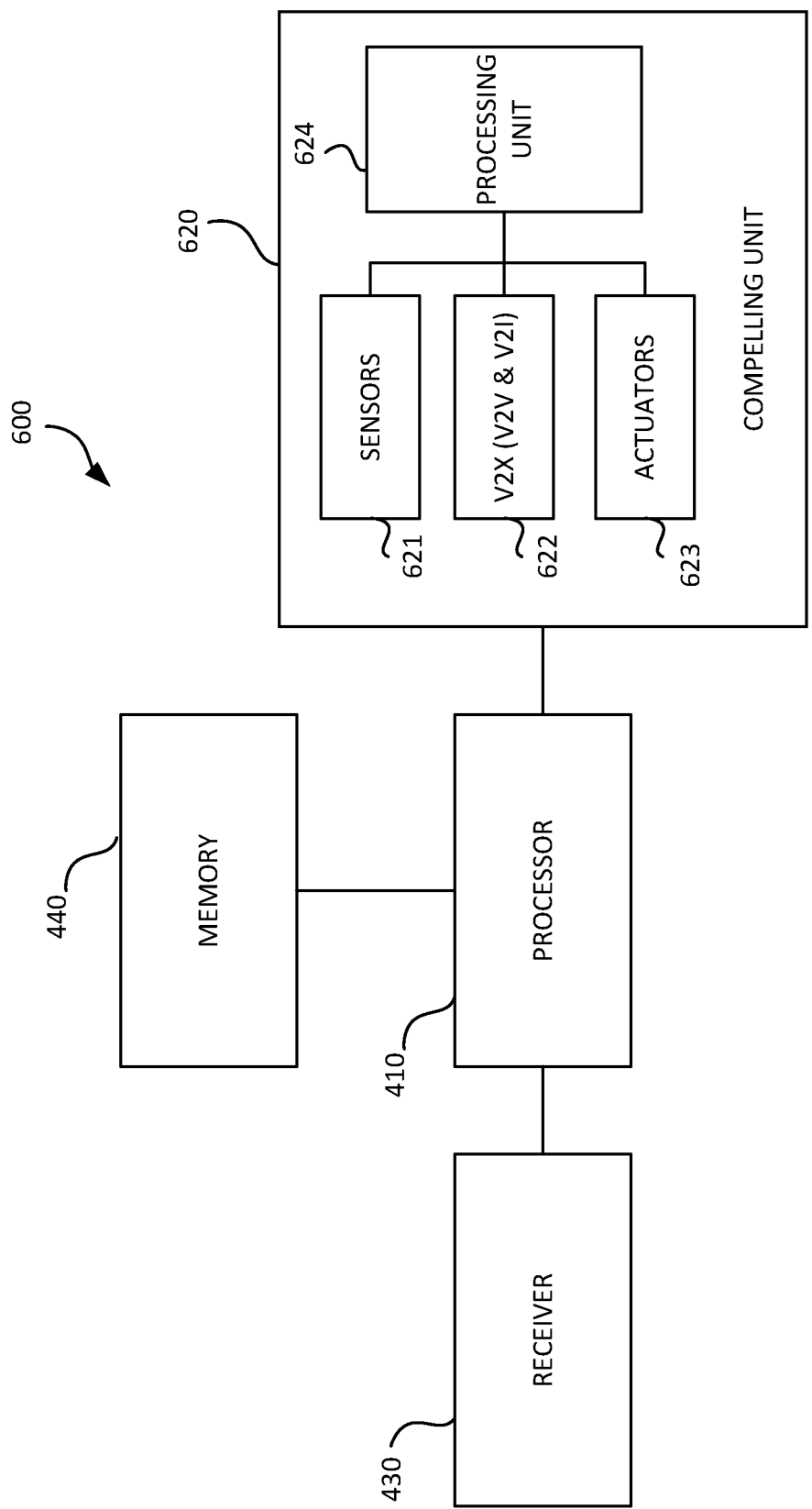
FIG. 6 is a functional block diagram of yet another exemplary parking system for a vehicle according to some embodiments of the disclosure.

FIG. 6 is a functional block diagram of yet another exemplary parking system 600 for a vehicle according to some embodiments of the disclosure. In an embodiment, the parking system 600 can include the memory 440, the processor 410, the receiver 430, and a compelling unit 620. The compelling unit 620 can be coupled to the processor 410 and configured to compel the vehicle 100 to move from the first parking location 110 to the second parking location 120. For example, the compelling unit 620 can be a transmitter that transmits instructions to the vehicle 100 to drive the vehicle 100 to move from the first parking location 110 to the second parking location 120 autonomously based on the navigation information provided by the processor 410.

In an embodiment, the compelling unit 620 can include a variety of sensors 621, a Vehicle-to-Everything (V2X) (e.g., Vehicle-to-Vehicle (V2V), Vehicle-to-Infrastructure (V2I) and Vehicle-to-Pedestrian (V2P)) module 622, a variety of actuators 623, and a processing unit 624. The sensors 621 can collect raw information about an environment where a vehicle is located. For example, the sensors 621 can include a Global Positioning System (GPS)/Inertial Measurement Unit (IMU) and a camera. As another embodiment, the sensors 621 can include a Light Detection and Ranging (LiDAR) module, which can capture information in various types of ambient light. As yet another embodiment, the sensors 621 can include a Radio Detection and Ranging (RADAR) module, which can transmit and receive radio waves that may be reflected from other objects. The V2X module 622 can enable the vehicle to wirelessly transmit and receive traffic information from other vehicles and infrastructures in the ambient environment. For example, the V2X module 622 can communicate with a traffic light, and enable the vehicle to receive the traffic light that has just turned red or warnings from an oncoming vehicle. The V2X module 622 can further communicate with other surrounding vehicles to learn their positions. The actuators 633 can be used to control and move the vehicle. For example, the actuators 633 can include a traction system. The processing unit 624 can analyze the raw information collected by the sensors 621 and the traffic information received by the V2X module 622, to learn whether a certain object is a vehicle or a pedestrian. The processing unit 624 can further control the traction system to enable the vehicle to stop, move, speed up, slow down, etc. For example, the processing unit 624 can control the traction system to enable the vehicle to slow down when the vehicle is approaching a traffic light that has turned red based on the analyzed red light captured by the LiDAR module.

Figure 7:
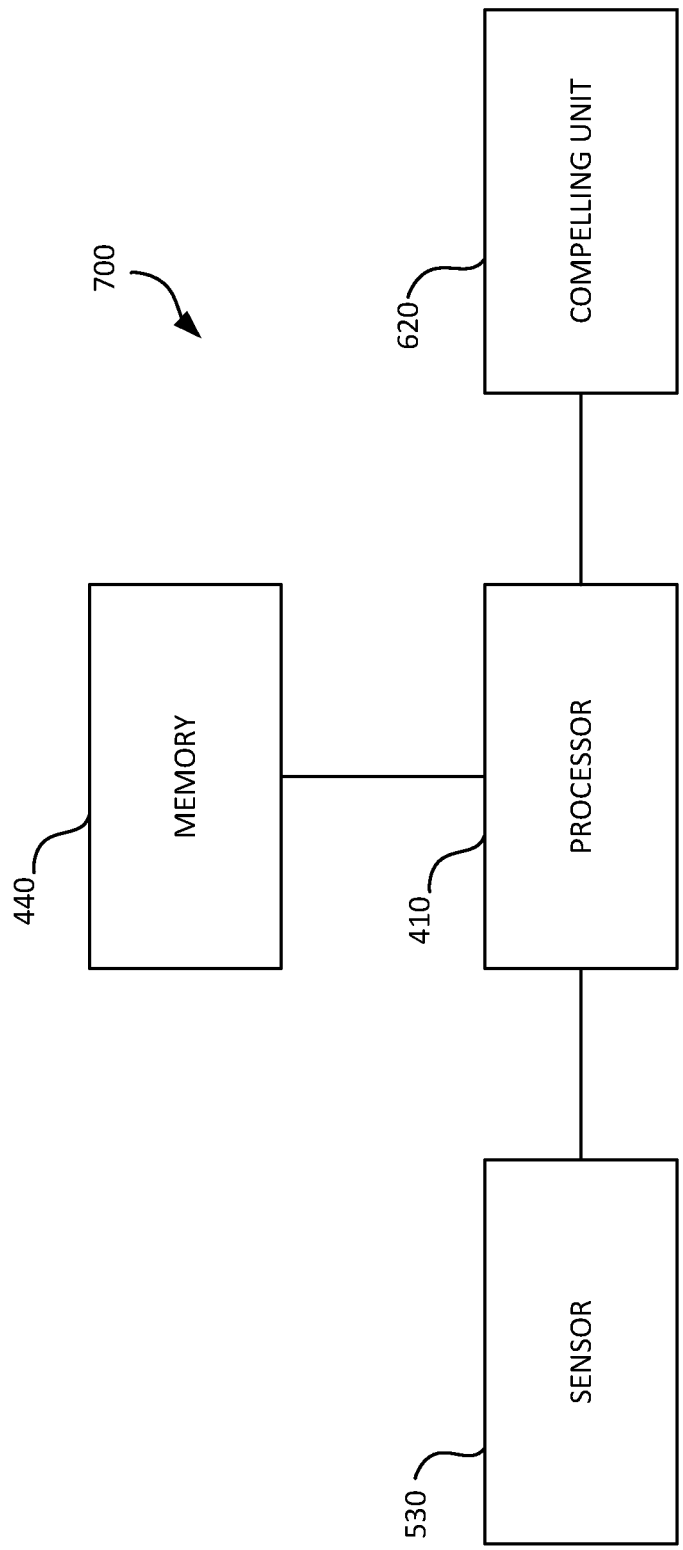
FIG. 7 is a functional block diagram of still another exemplary parking system for a vehicle according to some embodiments of the disclosure

FIG. 7 is a functional block diagram of still another exemplary parking system 700 for a vehicle according to some embodiments of the disclosure. In an embodiment, the parking system 700 can include the memory 440, the processor 410, the sensor 530, and the compelling unit 620.

In various embodiments according to the disclosure, the processor 410, the output unit 420, the receiver 430, the sensor 530 and the compelling unit 620 can include circuitry configured to perform the functions and processes described herein in combination with software or without software. In various examples, the processor 410 can be a digital signal processor (DSP), an application specific integrated circuit (ASIC), an application specific standard part (ASSP), a system on chip (SoC), a programmable logic device (PLD), a field programmable gate array (FPGA), a digitally enhanced circuit, or a comparable device or a combination thereof. In some other embodiments according to the disclosure, the processor 410 can be a central processing unit (CPU) or a microcontroller unit (MCU) configured to execute program instructions to perform various functions and processes described herein.

The parking systems 400, 500, 600 and 700 can optionally include other components, such as input and output devices, additional or signal processing circuitry, and the like. Accordingly, the parking systems 400, 500, 600 and 700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A parking method for an autonomous vehicle, comprising:
    determining whether a first weather condition at a first parking location meets a first criterion;
    identifying, when the first weather condition meets the first criterion, a second parking location at which a second weather condition meets a second criterion different from the first criterion;
    outputting with an output unit an alert to the autonomous vehicle parked at the first parking location indicating that the autonomous vehicle is to be moved to the second parking location; and
    compelling the autonomous vehicle to move to the second parking location.

2. The parking method of claim 1, wherein the first weather condition includes snowing, and the first criterion includes at least one of a snowfall amount of the snowing exceeding a snowfall amount threshold and a snowing duration of the snowing being less than a snowing duration threshold.

3. The parking method of claim 1, wherein the first weather condition includes raining, and the first criterion includes at least one of a rainfall amount of the raining exceeding a rainfall amount threshold and a raining duration being less than a raining duration threshold.

4. The parking method of claim 3, wherein the first criterion further includes the first parking location being located in a flood zone.

5. The parking method of claim 1, wherein the first weather condition includes hailing, and the first criterion includes at least one of a hailstone size of the hailing exceeding a hailstone size threshold, a hail thickness of the hailing exceeding a hail thickness threshold and a hailing duration of the hailing exceeding a hailing duration threshold.

6. The parking method of claim 5, wherein the first criterion further includes the first parking location being uncovered.

7. The parking method of claim 1, wherein the first weather condition includes icing, and the first criterion includes at least one of an ice amount of the icing exceeding an ice amount threshold and an icy road duration of the icing exceeding an icy road duration threshold.

8. The parking method of claim 1, further comprising:
    determining navigation information from the first parking location to the second parking location; and
    moving the autonomous vehicle based on the navigation information.

9. The parking method of claim 1, wherein the parking method includes outputting an alert to the autonomous vehicle parked at the first parking location indicating that the autonomous vehicle is to be moved to the second parking location.

10. A parking system for an autonomous vehicle, comprising:
    a memory configured to store a first criterion and a second criterion different from the first criterion;
    a processor coupled to the memory that is configured to determine whether a first weather condition at a first parking location meets the first criterion, and identify, when the first weather condition meets the first criterion, a second parking location at which a second weather condition meets the second criterion; and
    an output unit coupled to the processor that is configured to output an alert to the autonomous vehicle parked at the first parking location indicating that the autonomous vehicle is to be moved to the second parking location; and
    a compelling unit coupled to the processor that is configured to compel the autonomous vehicle to move to the second parking location.

11. The parking system of claim 10, wherein the first weather condition includes snowing, and the first criterion includes at least one of a snowfall amount of the snowing exceeding a snowfall amount threshold and a snowing duration of the snowing being less than a snowing duration threshold.

12. The parking system of claim 10, wherein the first weather condition includes raining, and the first criterion includes at least one of a rainfall amount of the raining exceeding a rainfall amount threshold and a raining duration being less than a raining duration threshold.

13. The parking system of claim 12, wherein the first criterion further includes the first parking location being located in a flooding area.

14. The parking system of claim 10, wherein the first weather condition includes hailing, and the first criterion includes at least one of a hailstone size of the hailing exceeding a hailstone size threshold, a hail thickness of the hailing exceeding a hail thickness threshold and a hailing duration of the hailing exceeding a hailing duration threshold.

15. The parking system of claim 14, wherein the first criterion further includes the first parking location being uncovered.

16. The parking system of claim 10, wherein the first weather condition includes icing, and the first criterion includes at least one of an ice amount of the icing exceeding an ice amount threshold and an icy road duration of the icing exceeding an icing road duration threshold.

17. The parking system of claim 10, wherein the processor is further configured to determine navigation information from the first parking location to the second parking location, and move the vehicle based on the navigation information.

18. The parking system of claim 10, wherein the parking system includes the output unit.

19. The parking system of claim 10, wherein the parking system includes the compelling unit.

* * * * *